(12) United States Patent
Kato

(10) Patent No.: US 7,471,190 B2
(45) Date of Patent: Dec. 30, 2008

(54) ANTI-THEFT VEHICLE ALARM SYSTEM

(75) Inventor: Kenji Kato, Okazaki (JP)

(73) Assignee: DENSO CORPORATION, Kariya (JP)

(*) Notice: Subject to any disclaimer, the term of this patent is extended or adjusted under 35 U.S.C. 154(b) by 273 days.

(21) Appl. No.: 11/544,875

(22) Filed: Oct. 10, 2006

(65) Prior Publication Data

US 2007/0090930 A1   Apr. 26, 2007

(30) Foreign Application Priority Data

Oct. 24, 2005   (JP) ............................... 2005-308528

(51) Int. Cl.
*B60R 25/10* (2006.01)
(52) U.S. Cl. ............................... 340/426.1; 340/426.25; 340/426.26; 340/428; 340/429; 340/438; 340/467; 307/10.1; 307/10.2
(58) Field of Classification Search ............. 340/426.1, 340/426.25, 426.26, 428, 429, 438, 439, 340/440, 467; 701/29, 45; 180/282; 307/10.1, 307/10.2
See application file for complete search history.

(56) References Cited

U.S. PATENT DOCUMENTS

| | | | |
|---|---|---|---|
| 5,670,934 A | * | 9/1997 | Ina et al. ............. 340/426.35 |
| 6,216,070 B1 | * | 4/2001 | Hayashi et al. ............. 701/45 |
| 6,373,147 B1 | * | 4/2002 | Miyaguchi et al. ......... 307/10.1 |
| 2004/0217849 A1 | | 11/2004 | Maehara |

FOREIGN PATENT DOCUMENTS

| | | |
|---|---|---|
| EP | 1 188 625 A2 | 8/2001 |
| JP | A-03-197259 | 8/1991 |
| JP | A-04-123957 | 4/1992 |
| JP | A-2003-034233 | 2/2003 |

OTHER PUBLICATIONS

Office Action dated Apr. 14, 2008 in corresponding German Patent Application No. 10 2006 049 903.4-51 (and English translation).

* cited by examiner

*Primary Examiner*—Hung T. Nguyen
(74) *Attorney, Agent, or Firm*—Posz Law Group, PLC

(57) ABSTRACT

An anti-theft vehicle alarm system includes an acceleration sensor acting as a tilt sensor, a microcomputer, a first power source for supplying a first voltage to the microcomputer, and a second power source for supplying a second voltage to the acceleration sensor. The microcomputer calculates a tilt angle of a vehicle from output of the acceleration sensor and activates an alarm in accordance with the tilt angle. If the second voltage is outside a predetermined voltage range, for example, due to a reduction in battery voltage, the microcomputer temporarily stops to activate the alarm to prevent a false alarm. The microcomputer monitors the second voltage not the battery voltage. Thus, even when the second voltage is outside the threshold range, for example, due to a breakdown in the second power source, the false alarm can be prevented.

10 Claims, 3 Drawing Sheets

ANTI-THEFT VEHICLE ALARM SYSTEM

CROSS REFERENCE TO RELATED APPLICATION

This application is based on and incorporates herein by reference Japanese Patent Application No. 2005-308528 filed on Oct. 24, 2005.

FIELD OF THE INVENTION

The present invention relates to an anti-theft vehicle alarm system.

BACKGROUND OF THE INVENTION

As disclosed in JP-A-2003-34233, an anti-theft vehicle alarm system has been developed that produces an alarm if an attempt is made to enter a vehicle, break a window of the vehicle, or jack-up the vehicle. For example, the alarm system includes a tilt sensor to detect a tilt angle of the vehicle in order to determine whether the vehicle is jacked-up. The tilt sensor is an acceleration sensor that has a detection axis parallel to ground to detect the acceleration of gravity in order to the tilt angle of the vehicle.

Typically, the alarm system switches to an alarm mode after a driver parks the vehicle and locks a door of the vehicle. Then, when the driver returns to the vehicle and unlocks the door, the alarm system leaves the alarm mode. The alarm system includes a microcomputer that stores a tilt sensor output as a reference value at the moment in time the door is locked. The microcomputer compares the reference value with each output of the tilt sensor while the vehicle is parked. Thus, the microcomputer calculates a change in the tilt angle of the vehicle. If the change exceeds a predetermined range, the alarm system produces the alarm.

The microcomputer is powered by a first power source and the tilt sensor is powered by a second power source separated from the first power source. The first power source generates a first voltage from a battery voltage and supplies the first voltage to the microcomputer. The second power source generates a second voltage from the battery voltage and supplies the second voltage to the tilt sensor. In this case, the second power source supplies the second voltage to the tilt sensor intermittently in order to cause the tilt sensor to operate intermittently. This approach reduces the amount of current consumed during the periods the vehicle is parked.

When the alarm system switches to the alarm mode, the microcomputer stores the tilt sensor output as the reference value, stops the second power source, and then switches to a sleep mode. Then, after a predetermined time period (e.g., 100 microseconds) has been elapsed, the microcomputer wakes up from the sleep mode. Then, the microcomputer starts the second power source, receives the tilt sensor output, and calculates the change in the tilt angle of the vehicle. If the change is within the predetermined range, the microcomputer stops the second power source and switches to the sleep mode again. The microcomputer repeats this intermittent operation until the change is outside the predetermined range. If the change is outside the predetermined range, the alarm system produces the alarm.

Typically, in the alarm system, as the battery voltage decreases, the first and second voltages decrease accordingly. In this case, the second voltage supplied to the tilt sensor begins to decrease earlier than the first voltage supplied to the microcomputer.

The microcomputer converts the tilt sensor output to digital value by using a ratio between the tilt sensor output and the first voltage. When the second voltage changes, the tilt sensor output changes accordingly. Therefore, the tilt sensor output may deviate from its true value. As a result, a false alarm may be activated.

To overcome the above problem, an apparatus disclosed in JP-2889992 includes detection means for detecting the battery voltage. When the battery voltage decreases below a threshold value during the alarm mode, the alarm process is halted and the tilt sensor is initialized. The initialization clears the stored tilt angle in order to prevent the false alarm to be activated. Then, the alarm process restarts.

However, the apparatus has problems to be overcome. The decreases in the first and second voltages depend on designs of the first and second power sources and environmental factors such as temperature. Therefore, the threshold value needs to be set to a high value.

Further, in the apparatus, the second power source for supplying the second voltage to the tilt sensor is separated from the first power source for supplying the first voltage to the microcomputer. Therefore, when the second voltage decreases due to a breakdown in the second power source, the detection means cannot detect the decrease in the second voltage. As a result, the false alarm may be activated.

SUMMARY OF THE INVENTION

In view of the above-described problem, it is an object of the present invention to provide an anti-theft vehicle alarm system that works without activating a false alarm even when a battery voltage decreases.

An anti-theft vehicle alarm system includes an acceleration sensor acting as a tilt sensor, a microcomputer as control means, first and second power sources, and a horn as sound means.

The acceleration sensor detects acceleration applied to a vehicle in at least one direction. The microcomputer performs an alarm process for detecting a possible theft of the vehicle based on a tilt angle of the vehicle. The microcomputer calculates a tilt angle of the vehicle from output of the acceleration sensor and outputs an alarm signal in accordance with the tilt angle. The first power source generates a first voltage from a battery of the vehicle and supplies the first voltage to the microcomputer. The second power source generates a second voltage from the battery and supplies the second voltage to the acceleration sensor. The horn produces an audible alarm in response to the alarm signal.

In the alarm system, the microcomputer monitors the second voltage supplied to the acceleration sensor. If the second voltage is outside a predetermined threshold range, the microcomputer stops to calculate the tilt angle and stops to output the alarm signal until the second voltage returns within the threshold range. Thus, when the second voltage is outside the threshold range, the alarm system can be prevented from activating the false alarm.

The microcomputer monitors the second voltage not the battery voltage. Thus, even when the second voltage is outside the predetermined threshold range due to a breakdown in the second power source, the microcomputer can detect the breakdown in the second power source. Further, the threshold range can be set to a narrow range, as compared to when the battery voltage is monitored.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
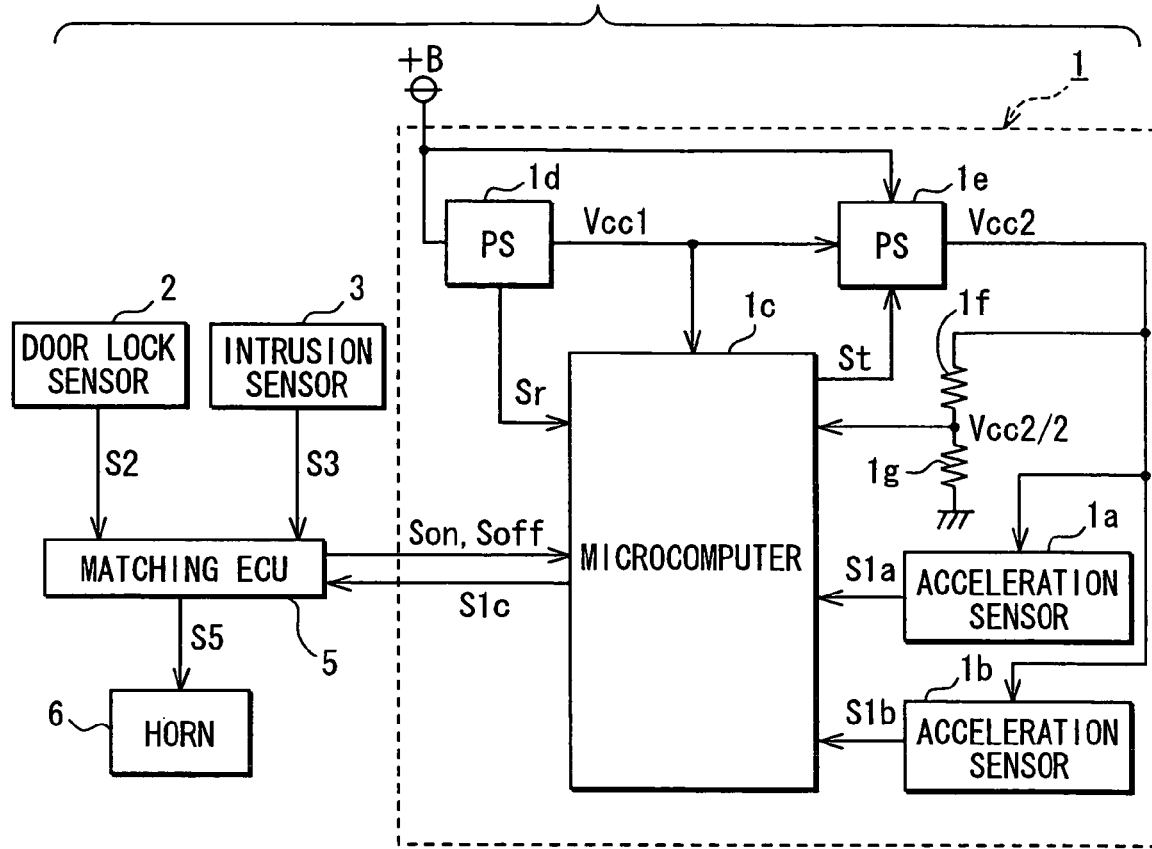
FIG. 1 is a block diagram of an anti-theft vehicle alarm system according to an embodiment of the present invention.

Referring to FIG. 1, an anti-theft vehicle alarm system 10 includes a tilt sensor 1, a door lock sensor 2, an intrusion sensor 3, a matching electronic control unit (ECU) 5, and a horn 6.

The tilt sensor 1 has acceleration sensors 1a, 1b, a microcomputer 1c, a first power source 1d for the microcomputer 1c, a second power source 1e for the acceleration sensors 1a, 1b, and resistors 1f, 1g having the same resistance value.

The acceleration sensor 1a detects acceleration of a vehicle in a first horizontal direction and the acceleration sensor 1b detects the acceleration in a second horizontal direction orthogonal to the first horizontal direction. For example, the acceleration sensor 1a detects the acceleration in a forward-backward direction and the acceleration sensor 1b detects the acceleration in a side-to-side direction. The acceleration sensor 1a generates an acceleration voltage signal S1a based on the detected forward-backward acceleration and the acceleration sensor 1b generates an acceleration voltage signal S1b based on the detected side-to-side acceleration. The acceleration voltage signals S1, S2 are analog signals.

The microcomputer 1c has a central processing unit (CPU), a read-only memory (ROM), a random access memory (RAM), an input/output (I/O) interface, an analog-to digital (A/D) converter, and the like. The microcomputer 1c performs an alarm process Pa shown in FIG. 2 in accordance with a program stored in the ROM. Specifically, the microcomputer 1c receives the acceleration voltage signals S1a, S1b from the acceleration sensors 1a, 1b, respectively, and converts the acceleration voltage signals S1a, S1b to digital signals using the A/D converter. Then, the microcomputer 1c calculates a change in a tilt angle of the vehicle from the digital signals and determines whether the vehicle is jacked up. Further, the microcomputer 1c feeds a timing signal St to the second power source 1e.

Figure 4:
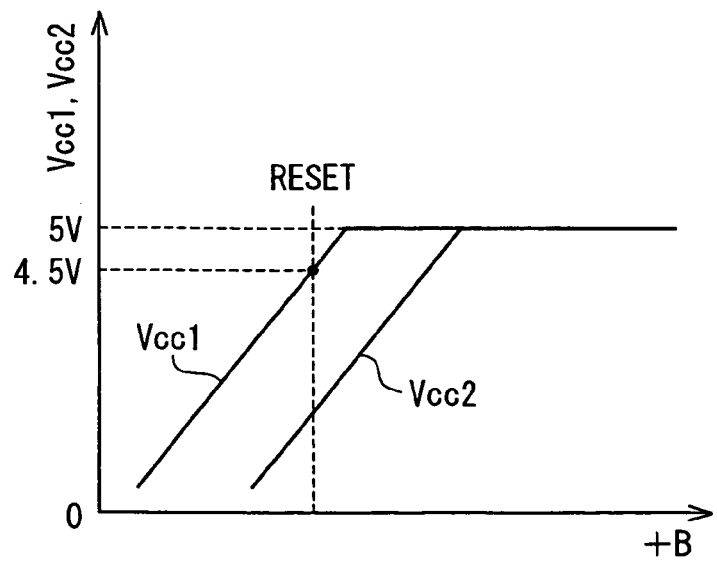
FIG. 4 is a graph showing relationships between a battery voltage and voltages supplied to the microcomputer and a tilt sensor of the alarm system of FIG. 1.

The first power source 1d generates a first voltage Vcc1 from a battery voltage +B and supplies the first voltage Vcc1 to the microcomputer 1c. As shown in FIG. 4, the first voltage Vcc1 is maintained constant at a predetermined level (e.g., 5 volts) as long as the battery voltage +B is within a normal range. When the battery voltage +B falls outside the normal range, the first voltage Vcc1 falls below the level. The first power source 1d sends a reset signal Sr to the microcomputer 1c to reset the microcomputer 1c, when the first voltage Vcc1 falls below a minimum operating voltage (e.g., 4.5 volts) of the microcomputer 1c.

The second power source 1e generates a second voltage Vcc2 from the battery voltage +B by using the first voltage Vcc1 as a reference. For example, the second power source 1e generates the second voltage Vcc2 such that the first voltage Vcc1 and the second voltage Vcc2 are the same. The second power source 1e supplies the second voltage Vcc2 to each of the acceleration sensors 1a, 1b in response to the timing signal St fed from the microcomputer 1c. Thus, the acceleration sensors 1a, 1b operates intermittently. This intermittent operation reduces the amount of current consumed during periods the vehicle is parked.

The second voltage Vcc2 is evenly divided between the resistors 1f, 1g. A divided voltage Vcc2/2 is fed to the microcomputer 1c so that the microcomputer 1c can monitor a voltage that depends on the second voltage Vcc2.

The microcomputer 1c monitors the divided voltage Vcc2/2 not the second voltage Vcc2 for the following reason. The microcomputer 1c determines, based on the first voltage Vcc1 and the monitored voltage, whether the second voltage Vcc2 is within a proper range. In this case, if the monitored voltage is higher than the first voltage Vcc1, the microcomputer 1c cannot determines whether the second voltage Vcc2 is within the proper range. Therefore, the microcomputer 1c monitors the divided voltage Vcc2/2 not the second voltage Vcc2.

The door lock sensor 2 determines whether a door of the vehicle is locked and outputs a door signal S2 indicating state (i.e., locked or unlocked) of the door to the matching ECU 5. For example, in a keyless entry system, the door lock sensor 2 outputs the door signal S2 to the matching ECU 5, when the door is locked or unlocked by means of a remote control key. If a body ECU (not shown) of the vehicle uses a door lock/unlock signal or a door actuator on/off signal, the door lock/unlock signal or the door actuator on/off signal can be used as the door signal S2.

The intrusion sensor 3 may be, for example, an infrared sensor. The intrusion sensor 3 sends an intrusion signal S3 to the matching ECU 5 when someone enters the vehicle. In addition to or instead of the intrusion sensor 3, the alarm system 10 may include a window sensor for detecting window breakage, a shock sensor, or the like.

The matching ECU 5 sounds the horn 6 based on signals sent from the tilt sensor 1, the door lock sensor 2, and the intrusion sensor 3.

Specifically, when the door signal S2 indicates that the door is locked, the matching ECU 5 sends an alarm-on signal Son to the microcomputer 1c of the tilt sensor 1. The alarm-on signal Son causes the microcomputer 1c to switch to an alarm mode where the microcomputer 1c determines, based on the acceleration voltage signals S1a, S1b, whether the attempt is made to steal the vehicle. When the microcomputer 1c determines that the attempt is made, the microcomputer 1c sends an alarm signal S1c to the matching ECU 5. The matching ECU 5 sends a horn drive signal S5 to the horn 6 in response to the alarm signal S1c or the intrusion signal S3.

The horn 6 produces an audible alarm in response to the horn drive signal S5.

In contrast, when the door signal S2 indicates that the door is unlocked, the matching ECU 5 sends an alarm-off signal Soff to the microcomputer 1c of the tilt sensor 1. The alarm-off signal Soff causes the microcomputer 1c to leave the alarm mode.

Figure 2:
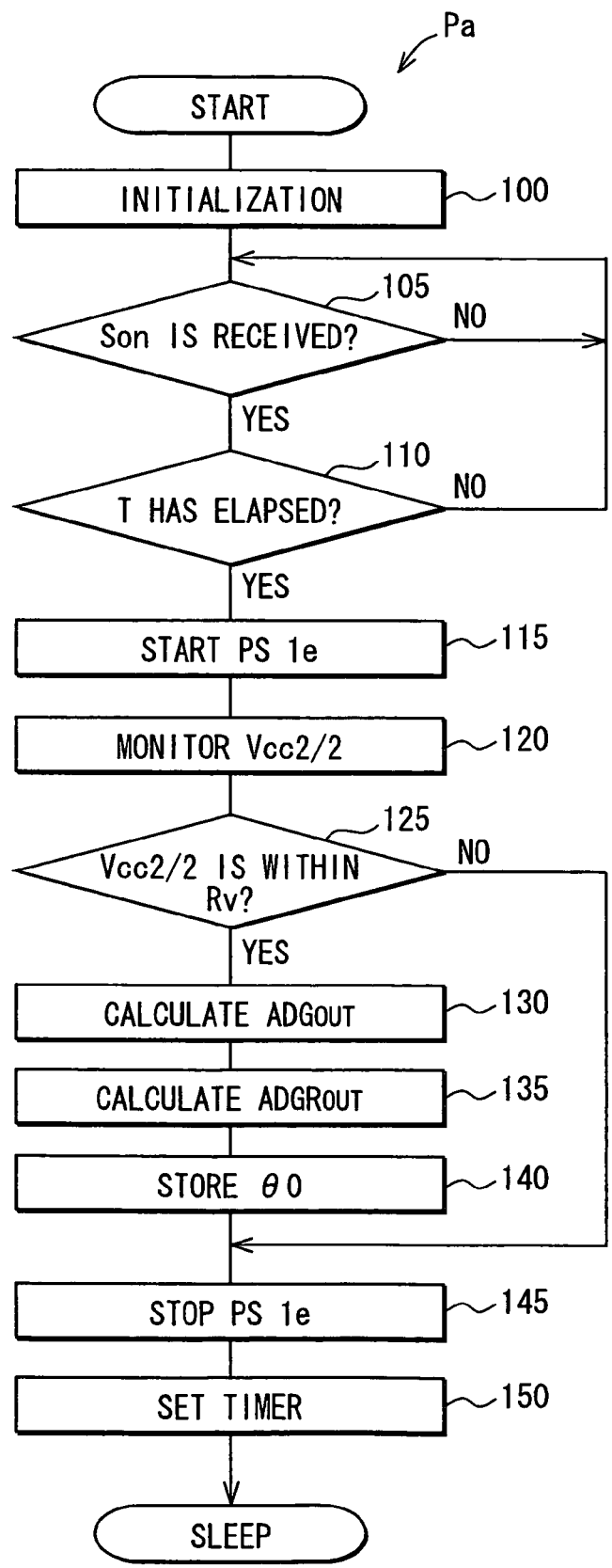
FIG. 2 is a flowchart of an alarm process that is initially performed by a microcomputer of the alarm system of FIG. 1.

The microcomputer 1c begins to perform the alarm process Pa shown in FIG. 2, after the battery voltage +B is applied to the first power source 1d and power-on reset is released.

The alarm process Pa starts at step 100 where the microcomputer 1c is initialized. For example, data stored in the RAM is cleared at step 100.

Then, the alarm process Pa proceeds to step 105 where the microcomputer 1c determines whether the microcomputer 1c receives the alarm-on signal Son from the matching ECU 5. If the microcomputer 1c receives no alarm-on signal Son i.e., receives the alarm-off signal Soff, the alarm process Pa repeats step 105 until receiving the alarm-on signal Son. If the microcomputer 1c receives the alarm-on signal Son, the alarm process Pa proceeds to step 110.

In step 110, the microcomputer 1c determines whether a predetermined time period T (e.g., 30 seconds) has elapsed from when the door was locked. If the time period T has not elapsed, the alarm process Pa returns to step 105. If the time period T has elapsed, the alarm process Pa proceeds to step 115.

In step 115, the microcomputer 1c starts the second power source 1e.

Then, the alarm process Pa proceeds to step 120 where the microcomputer 1c monitors the second voltage Vcc2 by monitoring the divided voltage Vcc2/2.

Then, the alarm process Pa proceeds to step 125 where the microcomputer 1c determines whether the divided voltage Vcc2/2 is within a predetermined threshold range Rv. If the divided voltage Vcc2/2 is outside the threshold range Rv, the alarm process Pa jumps to step 145. If the divided voltage Vcc2/2 is within the threshold range Rv, the alarm process Pa proceeds to step 130.

In step 130, the microcomputer 1c receives the acceleration voltage signals S1a, S1b from the acceleration sensors 1a, 1b and calculates the accelerations applied to the acceleration sensors 1a, 1b from the acceleration voltage signals S1a, S1b, respectively.

The acceleration sensors 1a, 1b output the acceleration voltage signals S1a, S1b, based on the second voltage Vcc2, in accordance with the applied accelerations.

For example, in the case that the acceleration of 1 G is applied when the second voltage Vcc2 is set to 5 volts, an analog value $G_{OUT}$ of each of the acceleration voltage signals S1a, S1b is given by the following equation:

$$G_{OUT} = \frac{Vcc2}{5} \times G_{IN} \quad (1)$$

In the equation (1), $G_{IN}$ represents the acceleration applied to each of the acceleration sensors 1a, 1b.

The A/D converter of the microcomputer 1c converts the analog value $G_{OUT}$ to, for example, a 10-bit digital value $ADG_{OUT}$. The digital value $ADG_{OUT}$ is given by the following equation:

$$ADG_{OUT} = \frac{(2^{10} - 1)}{Vcc1} \times G_{OUT} = \frac{1023}{5} \times \frac{Vcc2}{Vcc1} \times G_{IN} \quad (2)$$

Then, the alarm process Pa proceeds to step 135 where a ratiometric correction is performed. As described above, the acceleration voltage signals S1a, S1b are converted to the digital value $ADG_{OUT}$ by using the equations (1), (2). In the equation (1), the analog value $G_{OUT}$ is calculated based on the second voltage Vcc2. In the equation (2), the analog value $G_{OUT}$ is converted to the digital value $ADG_{OUT}$ based on the first voltage Vcc1. Therefore, a variation in the first voltage Vcc1 or the second voltage Vcc2 results in a variation in the digital value $ADG_{OUT}$. In short, the digital value $ADG_{OUT}$ varies with a ratio of the second voltage Vcc2 to the first voltage Vcc1.

The divided voltage Vcc2/2 can be converted to a 10-bit digital value $ADV_{OUT}$ by the following equation:

$$ADV_{OUT} = \frac{1023}{Vcc1} \times \frac{Vcc2}{2} \quad (3)$$

By substituting the equation (3) into the equation (2), a corrected value $ADGR_{OUT}$ is given as follows:

$$ADGR_{OUT} = \left(\frac{2 \times ADV_{OUT}}{5}\right) \times G_{IN} \quad (4)$$

In step 135, thus, the digital value $ADG_{OUT}$ is corrected to the corrected value $ADGR_{OUT}$.

As can be seen from the equation (4), the corrected value $ADGR_{OUT}$ is independent of each of the first and second voltages Vcc1, Vcc2. Therefore, the applied acceleration $G_{IN}$ can be accurately obtained by the ratiometric correction, regardless of the variations in the first and second voltages Vcc1, Vcc2. Thus, the alarm system 10 can be prevented from activating the false alarm.

Then, the alarm process Pa proceeds to step 140 where the microcomputer 1c stores an initial tilt angle θ0 that corresponds to the corrected value $ADGR_{OUT}$.

Then, the alarm process Pa proceeds to step 145 where the microcomputer 1c stops the second power source 1e.

Then, the alarm process Pa proceeds to step 150 where the microcomputer 1c sets a wake-up timer and switches to a sleep mode.

Figure 3:
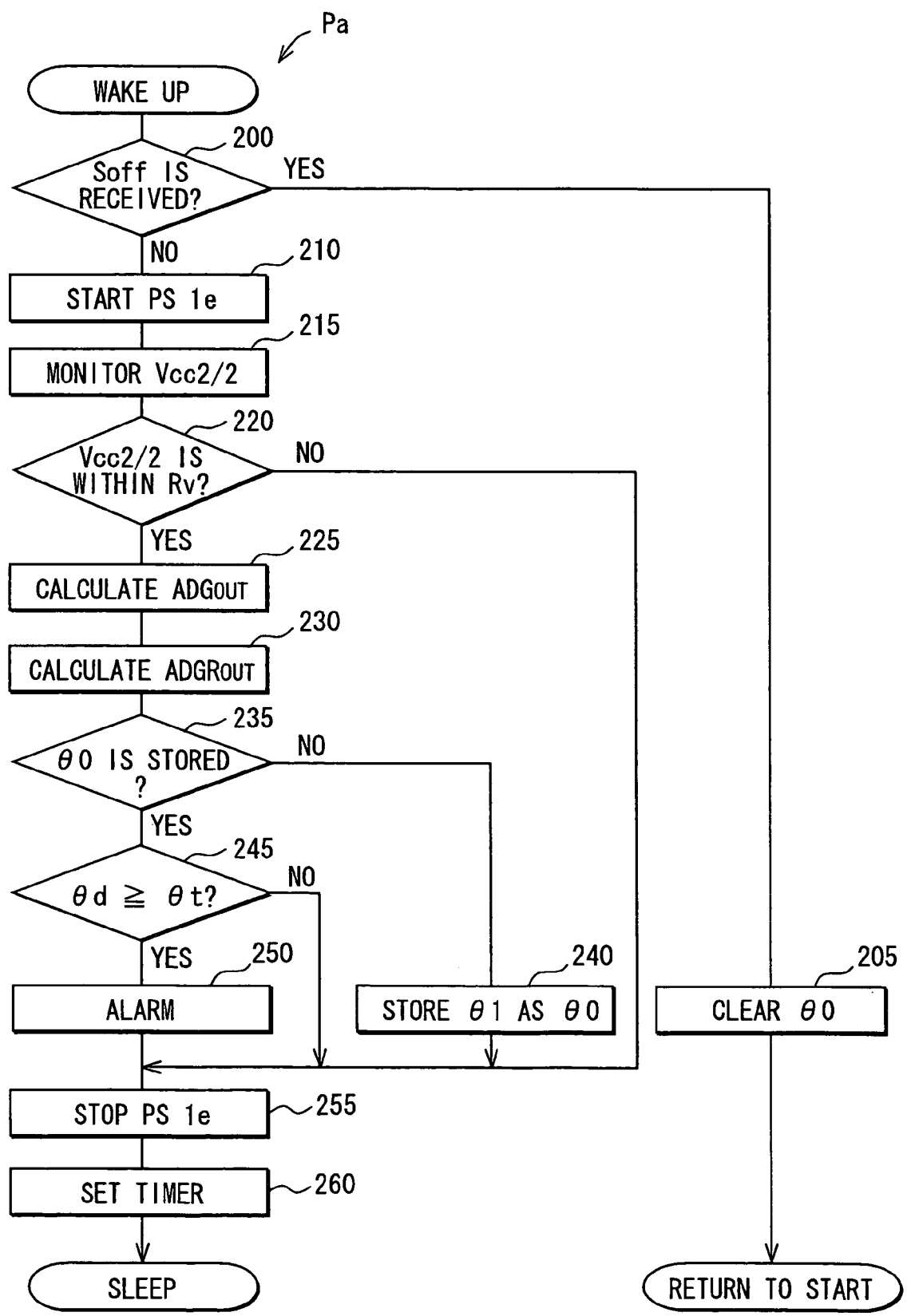
FIG. 3 is a flowchart of an alarm process that is performed by the microcomputer when the microcomputer wakes up from a sleep mode.

When the wake-up timer expires, the microcomputer 1c wakes up from the sleep mode and the alarm process Pa proceeds to step 200 shown in FIG. 3.

In step 200, the microcomputer 1c determines whether the microcomputer 1c receives the alarm-off signal Soff from the matching ECU 5. In the case that the microcomputer 1c receives the alarm-off signal Soff, the driver returns to the vehicle and unlocks the door. Therefore, if the microcomputer 1c receives the alarm-off signal Soff, the alarm process Pa proceeds to step 205 where the microcomputer 1c clears the initial tilt angle θ0 stored in step 140, and then returns to step 100 of FIG. 2. If the microcomputer 1c receive no alarm-off signal Soff, i.e., receives the alarm-on signal Son, the alarm process Pa proceeds to step 210 that corresponds to step 115 of FIG. 2.

Then, the alarm process Pa proceeds to step 215 that corresponds to step 120 of FIG. 2.

Then, the alarm process Pa proceeds to step 220 that corresponds to step 125 of FIG. 2. In step 220, if the divided voltage Vcc2/2 is outside the threshold range Rv, the alarm process Pa jumps to step 255 that corresponds to step 145 of FIG. 2. If the divided voltage Vcc2/2 is within the threshold range Rv, the alarm process Pa proceeds to step 225 that corresponds to step 130 of FIG. 2.

Then, the alarm process Pa proceeds to step 230 that corresponds to step 135 of FIG. 2.

Then, the alarm process Pa proceeds to step 235 where the microcomputer 1c determines whether the initial tilt angle θ0 is stored. If the initial tilt angle θ0 is not stored, the alarm process Pa proceeds to step 240 where the microcomputer 1c stores a current tilt angle θ1 as the initial tilt angle θ0. The current tilt angle θ1 corresponds to the corrected value $ADGR_{OUT}$ obtained in step 230. Then, the alarm process Pa jumps to step 255. If the initial tilt angle θ0 is stored, the alarm process Pa proceeds to step 245.

In step 245, the microcomputer 1c compares the initial tilt angle θ0 with the current tilt angle θ1. Then, the microcomputer 1c determines whether an angle difference θd between the initial tilt angle θ0 and the current tilt angle θ1 exceeds a predetermined threshold angle θt. If the angle difference θd does not exceed the threshold angle θt, the alarm process Pa jumps to step 255. If the angle difference θd exceeds the threshold angle θt, the alarm process Pa proceeds to step 250.

The threshold angle θt is set such that the alarm system 10 does not activate the false alarm, for example, when the vehicle sways in the wind. Therefore, the angle difference θd exceeding the threshold angle θt indicates that the vehicle is jacked-up.

In step 250, the microcomputer 1c sends the alarm signal S1c to the matching ECU 5. The matching ECU 5 sends the horn drive signal S5 to the horn 6 in response to the alarm signal S1c. Thus, the horn 6 produces the audible alarm.

Then, the alarm process Pa proceeds to step 255 that corresponds to step 145 of FIG. 2.

Then, the alarm process Pa proceeds to step 260 that corresponds to step 150 of FIG. 2 and the microcomputer 1c switches to the sleep mode.

As described above, in the alarm system 10, the microcomputer 1c monitors the second voltage Vcc2 not the battery voltage +B by monitoring the divided voltage Vcc2/2. In such an approach, even when the second voltage Vcc2 decreases, for example, due to a breakdown in the second power source 1e, the microcomputer 1c can detect the decrease in the second voltage Vcc2, i.e., the breakdown in the second power source 1e. Further, the threshold range can be set to a narrow range, as compared to when the decrease in the second voltage Vcc2 is determined by monitoring the battery voltage +B.

As shown in FIG. 4, when the battery voltage B+ decreases, the second voltage Vcc2 supplied to the acceleration sensors 1a, 1b begins to decrease earlier than the first voltage Vcc1 supplied to the microcomputer 1c. Therefore, the microcomputer 1c can detect the decrease in the second voltage Vcc2.

When the second voltage Vcc2 is outside a threshold range (i.e., when the divided voltage Vcc2/2 is outside the threshold range Rv), the alarm process Pa is temporarily halted. Then, the alarm process Pa restarts after the second voltage Vcc2 returns within the threshold range. Thus, the alarm system 10 can be prevented from activating the false alarm, when the second voltage Vcc2 is outside the threshold range.

Since the microcomputer 1c monitors the second voltage Vcc2, the variation in the applied acceleration $G_{IN}$ due to the variations in the first and second voltages Vcc1, Vcc2 can be corrected by the ratiometric correction. Thus, the applied acceleration $G_{IN}$ can be accurately obtained regardless of the variations in the first and second voltages Vcc1, Vcc2. Therefore, the change in the tilt angle can be accurately detected so that the alarm system 10 can be prevented from activating the false alarm.

MODIFICATIONS

The embodiment described above may be modified in various ways. For example, the microcomputer 1c and the matching ECU 5 may be combined into one unit.

When the divided voltage Vcc2/2 is outside the threshold range Rv at step 220, the process Pa may proceed to step 225 not step 255. In this case, the process Pa skips step 250 to prevent the false alarm.

The microcomputer 1c may monitor a rate or gradient of change in the divided voltage Vcc2/2. In this case, the microcomputer 1c stops the second power source 1e, when both the divided voltage Vcc2/2 is outside the voltage range and the rate or gradient of change in the divided voltage Vcc2/2 is less than a predetermined threshold value. In such an approach, when the divided voltage Vcc2/2 is outside the voltage range due to instantaneous noise, the microcomputer 1c can be prevented from stopping the second power source 1e.

Such changes and modifications are to be understood as being within the scope of the present invention as defined by the appended claims.

What is claimed is:

1. An anti-theft vehicle alarm system comprising:

an acceleration sensor that detects acceleration applied to a vehicle in at least one direction;

control means that performs an alarm process for detecting a possible theft of the vehicle based on a tilt angle of the vehicle, the control means including processing means that calculates a tilt angle of the vehicle from output of the acceleration sensor and outputs an drive signal in accordance with the tilt angle;

a first power source that generates a first voltage from a battery voltage of the vehicle and supplies the first voltage to the control means;

a second power source that generates a second voltage from the battery voltage and supplies the second voltage to the acceleration sensor; and sound means that produces an audible alarm in response to the drive signal, wherein the control means further includes monitor means for monitoring a third voltage that depends on the second voltage and stop means for stopping the processing means when the third voltage is outside a predetermined voltage range.

2. The alarm system according to claim 1, wherein
the third voltage is proportional to the second voltage.

3. The alarm system according to claim 2, further comprising:

at least two resistors between which the second voltage is divided, wherein the third voltage is equal to the divided second voltage.

4. The alarm system according to claim 1, wherein the control means further includes an analog-to-digital converter that converts the output of the acceleration sensor to a digital value and correction means that corrects the digital value using the first voltage and the third voltage.

5. The alarm system according to claim 4, wherein the correction means corrects the digital value using a ratio between the first voltage and the third voltage.

6. The alarm system according to claim 4, wherein the control means further includes memory means that stores the tilt angle calculated at a start of the alarm process as an initial tilt angle, and the processing means compares the initial tilt angle with each tilt angle calculated during the alarm process and outputs the drive signal to the sound means when an angle difference between the initial tilt angle and the each tilt angle exceeds or equal to a predetermined threshold angle.

7. The alarm system according to claim 6, wherein the memory means stores the initial tilt angle only when the third voltage is within the voltage range.

8. The alarm system according to claim 6, wherein the control means further includes restart means for restarting the processing means stopped by the stop means, and the memory means stores the tilt angle calculated at the restart of the alarm process as the initial tilt angle.

9. The alarm system according to claim 1, wherein the stop means stops the processing means when both the third voltage is outside the voltage range and a rate of change in the third voltage is less than a predetermined threshold value.

10. The alarm system according to claim 1, wherein the stop means stops the processing means when both the third voltage is outside the voltage range and a gradient of change in the third voltage is less than a predetermined threshold value.

* * * * *